(12) United States Patent
Chuang

(10) Patent No.: US 8,667,445 B2
(45) Date of Patent: Mar. 4, 2014

(54) POWER MESH MANAGEMENT METHOD

(75) Inventor: Chia-Lin Chuang, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 927 days.

(21) Appl. No.: 12/359,950

(22) Filed: Jan. 26, 2009

(65) Prior Publication Data
US 2009/0193381 A1 Jul. 30, 2009

(30) Foreign Application Priority Data
Jan. 30, 2008 (TW) .............................. 97103382 A

(51) Int. Cl.
*G06F 17/50* (2006.01)

(52) U.S. Cl.
USPC .......................................... 716/126; 716/127

(58) Field of Classification Search
USPC ................................................ 716/126–131
See application file for complete search history.

(56) References Cited

U.S. PATENT DOCUMENTS

| 7,240,314 B1 * | 7/2007 | Leung ........................... 257/773 |
| 7,429,532 B2 * | 9/2008 | Ramaswamy et al. ......... 438/689 |
| 7,739,624 B2 * | 6/2010 | McElvain et al. ............. 716/101 |
| 8,074,197 B2 * | 12/2011 | McElvain et al. ............. 716/115 |
| 8,122,412 B2 * | 2/2012 | McElvain et al. ............. 716/115 |
| 2001/0049813 A1 * | 12/2001 | Chan et al. ........................ 716/8 |
| 2006/0095872 A1 * | 5/2006 | McElvain et al. ................. 716/1 |

FOREIGN PATENT DOCUMENTS

JP 2001-244443 9/2001

* cited by examiner

*Primary Examiner* — Binh Tat
(74) *Attorney, Agent, or Firm* — McClure, Qualey & Rodack, LLP

(57) ABSTRACT

The invention discloses a power mesh management method utilized in an integrated IC. The integrated circuit includes a macro block including at least a macro block power supplying line growing along a first direction. The management method includes: defining a plurality of first power supplying lines located in a metal layer above the macro block, wherein each of the first supplying lines grows along the first direction; defining a plurality of second power supplying lines located in another metal layer above the macro block, wherein each of the second supplying lines grows along a second direction; defining a partial power supplying line from the plurality of first power supplying lines where the partial power supplying line overlaps the macro block power supplying line; and removing the partial power supplying line from the plurality of first power supplying lines.

17 Claims, 8 Drawing Sheets

POWER MESH MANAGEMENT METHOD

BACKGROUND OF THE INVENTION (a) Field of the Invention

The invention relates to a power mesh management method, particularly to a macro block power mesh management method.

(b) Description of the Related Art

During the integrated circuit design process, the APR (automatic placement and routing) tool not only helps a circuit designer placing the circuit elements at the suitable locations in the chip easily but also helps the circuit designer managing the power routing. The APR tool has become one of the indispensable tools for the circuit designer.

In general, the APR tool uses two types of blocks to manage the circuit elements. One type of the blocks is the standard cell. As the name implies, the standard cell is a standardized block of specific size and fixed power management method for managing some often-used standard circuit elements, such as: flip-flops, logic gates, and the like. Then, the APR tool can neatly arrange a plurality of standard cells in areas of the chip. The other type is the macro block. A macro block is used to manage some circuit elements of specific function designed by the circuit designer, such as: SRAM, ADC, and so on. In practical applications, as is well known in the industry, the size of the macro block usually depends on the size of the circuit elements for the specific function designed by the designer. The APR tool can also arrange the macro blocks at the suitable locations of the chip automatically.

However, although the APR tool can follow specific routing rules to manage the suitable locations for the macro block and to draw the power mesh for the macro block. (Power mesh is usually placed in the upper metal layers of the circuit.) But, as the APR tool can only handle regular management, detailed management still needs manual adjustments by a designer. Therefore, the APR tool still needs to be improved.

Please refer to FIG. 1 which shows a schematic diagram illustrating the macro block 100 managed by the APR tool according to the prior art. In this example, the macro block comprises the annular power supplying lines 110, 120 and the internal circuitry 130. The annular power supplying lines 110, 120 are of annular structure surrounding the internal circuitry and couple to the various circuit elements of the internal circuitry 130 (not shown in FIG. 1). The power supplying line 110 conducts the external power to the internal circuitry 130 through the power mesh in the upper layer (not sown in FIG. 1). And, the power supplying line 120 also conducts the ground voltage to the internal circuitry 130 through the power mesh in the upper layer (not sown in FIG. 1).

Please note that the above mentioned annular power supplying lines 110, 120, including horizontal direction and vertical direction, are just one example. In practical applications, the power supplying lines of the macro block 100 can be of any shape and are not limited to the annular structure surrounding the internal circuitry 130.

Then, please refer to FIG. 2 which shows the macro block 100 of FIG. 1 and the power mesh 200 located in a layer above the macro block 100. As shown in FIG. 2, the dotted line portion indicates the macro block 100 shown in FIG. 1 (including the annular power supplying lines 110, 120 and the internal circuitry 130) while the continuous line portion indicates the power mesh 200 managed by the APR tool in the prior art. As shown in the figure, the power mesh 200 comprises the horizontal power supplying lines 210 and the vertical power supplying lines 220. The vertical power supplying lines 220 are located in a layer above the horizontal power supplying lines 210. In other words, the power supplying line 110, 120, the horizontal power supplying lines 210 and the vertical power supplying lines 220 are respectively located in different metal layer. The power supplying lines 210 and the power supplying lines 220 are mutually perpendicular to form a matrix. Besides, the power supplying lines 210 include a plurality of power lines 211 and ground lines 212 placed in a mutually interlaced manner while the power supplying lines 220 include a plurality of power lines 221 and ground lines 222 placed in a mutually interlaced manner. Please note that only three sets of power supplying lines 210, 220 are shown in the figure for convenience. In general, when there are more power supplying lines 210, 220, the power meshes formed are denser too.

Besides, please note that the small squares 230 shown in FIG. 2 are the via holes ("vias")/contact and the via plugs for coupling/connecting the structures of different layers. In one embodiment of the invention, as the power lines 211, 221 correspond to the same electrical property, the power lines 211, 221 couple to each other through the vias and the via plugs 230. On the other hand, as the ground lines 212, 222 also correspond to the same electrical property, the ground lines also couple to each other through the vias and the via plugs 230.

As known by the industry, the power lines 211, 221 couple to the external power (not shown in the figure) and the above mentioned annular power supplying line 110 through the vias and the via plugs at suitable locations for conducting the voltage provided by the external power to the macro block 100. The ground lines 212, 222 couple to the ground voltage and the above mentioned annular power supplying line 120 through the vias and the via plugs at suitable locations for conducting the ground voltage to the macro block 100.

Please note that, since it is necessary to conduct the external power/ground voltage into the macro block 100, the resistance between the external power and the macro block 100 is generally properly designed to obtain better overall circuit performance. The resistance between the external power and the macro block 100 is directly related to the number of the vias and via plugs. As is well known to the industry that, due to the resistance shunting effect, the more is the number of the vias the more is the reduction of the resistance between the external power and the macro block 100.

Hence, the position that can be allocated for the via becomes crucial. As mentioned before, the adjustable range of the resistance becomes larger when there are more allocable positions for the via. Therefore, the routing rule of the APR tool is usually designed to place the via and the via plug for coupling at the overlapping areas of the annular power supplying lines 110/120 and the power supplying lines 210/220, and at the overlapping areas of the power supplying line 210 and the power supplying line 220. However, such a design will cause some problems.

Please refer to FIG. 3 which shows the interconnections of the annular power supplying lines 110, 120 and the power mesh 200 in the layer above the annular power supplying lines 110, 120 through the vias and the via plugs. As shown in FIG. 3, the power supplying lines 210, 220 overlap the annular power supplying lines 110, 120 in areas 240 where the power supplying lines 210, 220 interlace the annular power supplying lines 110, 120 vertically. Therefore, the electrical interconnections among these are provided by the vias and the via plugs located in these vertically interlaced overlapping areas. But, as the power supplying lines 210, 220 in the upper layer overlap the annular power supplying lines 110, 120 in areas 250 where the power supplying lines 210 are parallel to the annular power supplying lines 110, 120. The electrical interconnections among these become a problem.

Please refer to FIG. 4 regarding the possible problems of the electrical interconnections in areas 250 among the power supplying lines 210, 220 and the annular power supplying lines 110, 120. FIG. 4 shows two kinds of situations that may cause problems. The first situation is indicated by the area 251. As the power line 211 of the power mesh 200 overlaps the annular power supplying line 110 of the macro block 100 that is to be coupled in the area 251, the via and the via plug are placed in the overlapping area to form the electrical connections. But, from the vertical cross-section point of view, the via and the via plug form a wall-like structure due to the neighboring parallel relationship. As the other metal routings of the same metal layer cannot pass through this wall-like structure, the flexibility of routing is greatly limited. The second situation is indicated by the area 252. As the ground line 222 of the power mesh 200 overlaps the annular power supplying line 120 of the macro block 100 that is to be coupled in the area 252, the via and the via plug are placed in the overlapping area to form electrical connections. But, the power supplying lines 211 and the annular power supplying line 120 are of different electrical potential and are in parallel overlapping relationship. The area available for the via and the via plug in the area 252 to couple the ground line 222 and the annular power supplying lines 120 becomes greatly limited. Therefore, the resistance of the power mesh cannot be reduced effectively.

Therefore, those who are skilled in the art must develop new routing rules and layout methods to solve the above mentioned problems.

BRIEF SUMMARY OF THE INVENTION

Therefore, one object of the invention is to provide a routing rule of the APR tool and the related integrated circuit layout method for solving the problems in the prior art.

A power mesh management method for placing a power mesh in an integrated circuit is provided according to one embodiment of the invention. The integrated circuit includes at least a macro block. Each macro block comprises at least a macro block power supplying line growing along a first direction. The management method defines a plurality of first power supplying lines, a plurality of second power supplying lines, and a partial power supplying line from the plurality of first power supplying lines. The first power supplying lines are located in a metal layer above the macro block. Each of the first supplying lines grows along the first direction. The second power supplying lines are located in another metal layer above the macro block. Each of the second supplying lines grows along a second direction. The partial power supplying line from the plurality of first power supplying lines overlaps the macro block power supplying line. The partial power supplying line is removed from the plurality of first power supplying lines.

An integrated circuit layout structure is provided according to another embodiment of the invention. The structure includes at least a macro block. Each macro block comprises at least a macro block power supplying line growing along a first direction and a power mesh located in at least a metal layer above the macro block. The power mesh electrically couples to an external power and the macro block to input the external power to the macro block for providing the power needed by the macro block. The power mesh comprises a plurality of first power supplying lines, a plurality of second power supplying lines, and a plurality of vias and via plugs. Each of the first supplying lines grows along the first direction. Each of the second supplying lines grows along the second direction. The plurality of vias and via plugs located between the macro block and the power mesh electrically couple the macro block and the power mesh. None of the first power supplying lines is placed at the position, overlapping the position of the macro block power supplying line, above the macro block power supplying line.

The APR tool according to the invention provides a circuit layout having an improved power mesh. The via and the via plug are prevented from forming a wall-like structure that blocks other conducting wires. On the other hand, the structure located in the upper layer of the power mesh is also prevented from blocking the structure located in the upper layer of the power mesh while coupling the macro block through the via and via plug. Therefore, the circuit design flexibility is increased.

DETAILED DESCRIPTION OF THE INVENTION

Figure 5:
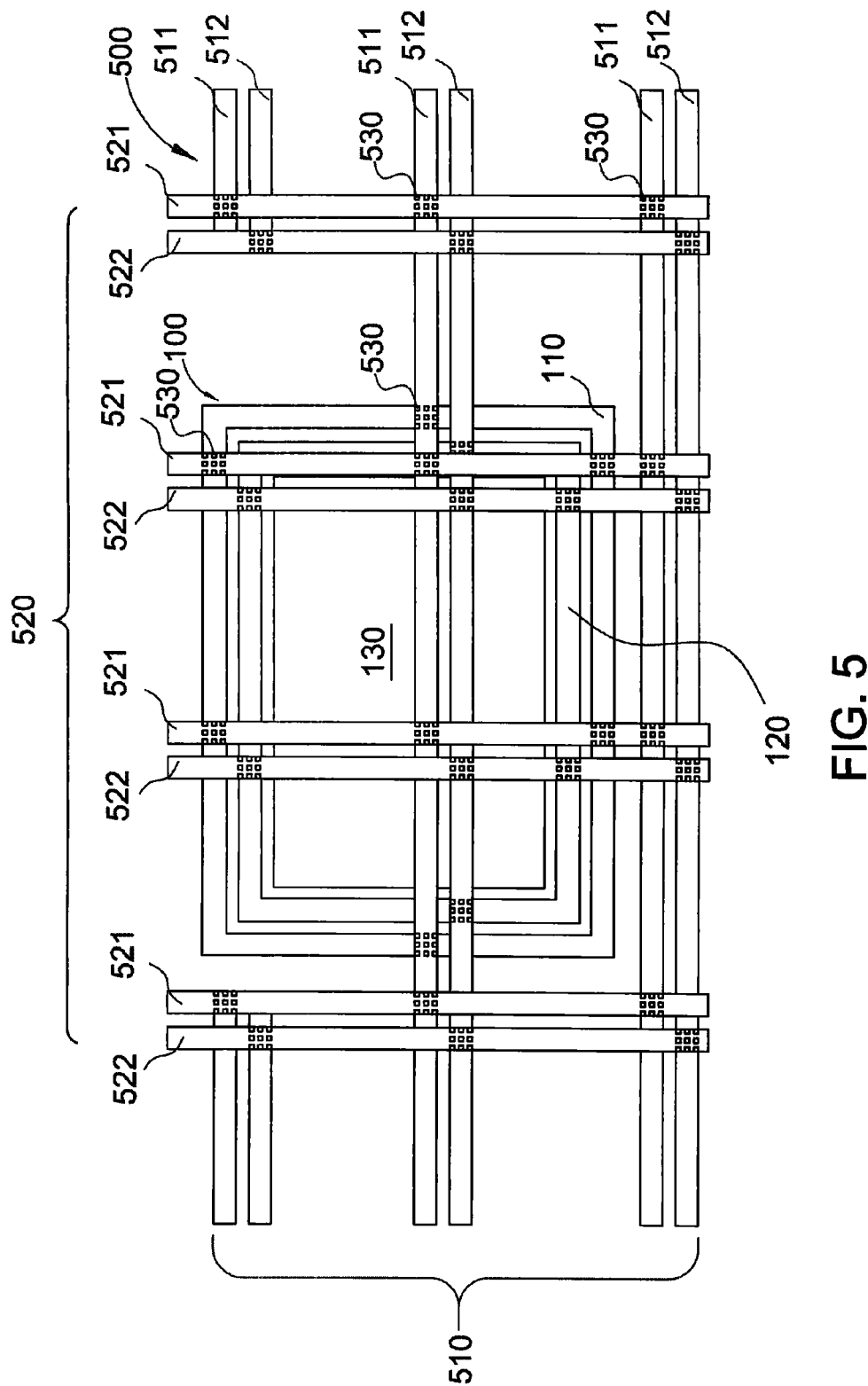
FIG. 5 shows a schematic diagram illustrating a macro block and the related power mesh managed by the APR tool according to a first embodiment of the invention.

Please refer to FIG. 5 which shows a schematic diagram illustrating the macro block and the related power mesh managed by the APR tool according to the first embodiment of the invention. Please note that the macro block 100, the related annular power supplying lines 110, 120, and the internal circuitry 130 shown in FIG. 5 are exactly the same as the above mentioned macro block 100, the related annular power supplying lines 110, 120, and the internal circuitry 130. The power lines 511, 521 and the ground lines 512, 522 also have the same functions as the above mentioned power lines 211, 221 and the ground lines 212, 222. But, the structure of the power mesh 500 is different from the above mentioned power mesh 200. Although the SRAM memory unit is taken as an example of the macro block 100 according to the embodiment of the invention, those who are skilled in the art should be able to understand that the invention is not limited by these examples. Any common or newly developed circuit element can be configured as the macro block 100 and is to be encompassed by the scope of the present invention.

As shown in FIG. 5, the power mesh 500 includes the horizontal power supplying line 510 and the vertical power supplying line 520 where the vertical power supplying line 520 is located in the layer above the horizontal power supplying line 510. However, please note that the power mesh 500 and the annular power supplying lines 110, 120 do not have any overlapping portion that is growing along corresponding to the same direction (that is neighboring in parallel). Therefore, in the embodiments according to the invention, the situation of forming a wall-like structure by the vias or blocking the vias from coupling to the annular power supplying lines 110/120 in the prior art will not happen.

Figure 6:
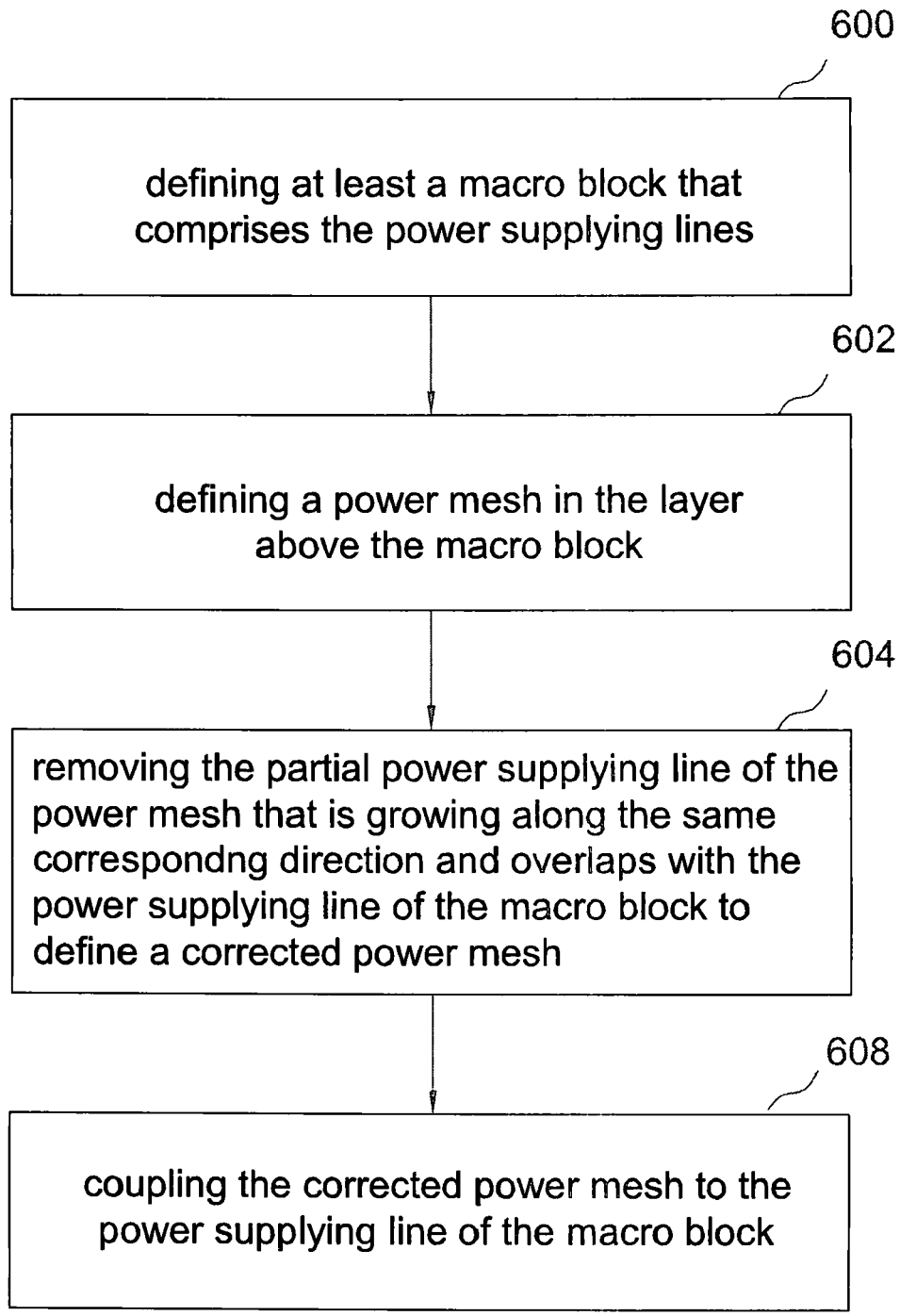
FIG. 6 shows a flow chart illustrating the steps executed by the APR tool according to one embodiment of the invention.

Please refer to FIG. 6 and FIG. 5. FIG. 6 shows the flow chart illustrating the steps executed by the APR tool according to one embodiment of the invention. The method comprises the following steps:

Step 600: defining at least a macro block 100 that comprises the power supplying lines 110, 120 and the internal circuitry 130;

Step 602: defining a power mesh in the layer above the macro block that includes a structure growing along the vertical direction and a structure growing along the horizontal direction that are placed in different metal layers;

Step 604: removing the partial power supplying line of the power mesh that is growing along the same corresponding direction (or corresponding to the same direction) and overlaps with the power supplying line of the macro block to define a corrected power mesh; and Step 606: coupling the corrected power mesh to the power supplying line of the macro block. The coupling step is completed by forming the via and the via plug in the overlapping area where the corrected power mesh vertically intersects with the power supplying line of the macro block according to one embodiment of the invention.

At first, the APR tool according to the invention allocates the macro block 100 at the suitable location on the chip (Step 600). The internal circuitry 130 of the macro block 100 couples to the related annular power supplying lines 110/120 properly for conducting the external power into the internal circuitry 130 through the annular power supplying lines 110/120. Please note that the shape of the annular power supplying lines 110/120 is just one of the examples according to the invention and should not be construed as any limitation on the range of implementation of the invention. In practical applications, the power supplying line of the macro block 100 can be of any shape distributed around or within the macro block 100 and is not limited to the annular shape.

Then, the APR tool according to the invention defines a power mesh in the layer above the macro block 100 (Step 602). Please note that the power mesh defined by the APR tool in this step is just the above mentioned power mesh 200. The power mesh 500 shown in FIG. 5 is not yet defined.

Figure 2:
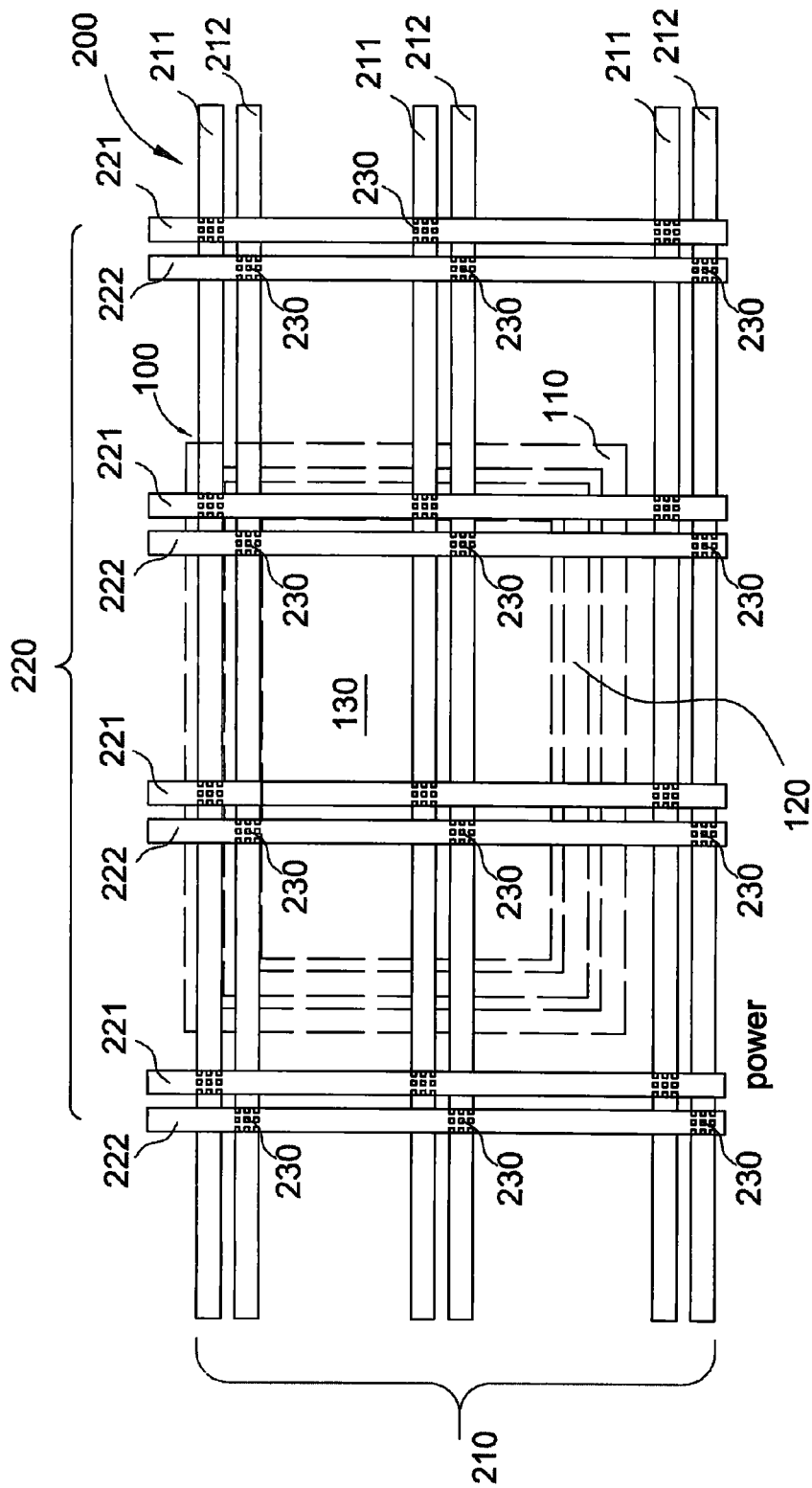
FIG. 2 shows a schematic diagram illustrating the macro block, the annular power supplying lines, and the power mesh above the macro block in FIG. 1.
Figure 3:
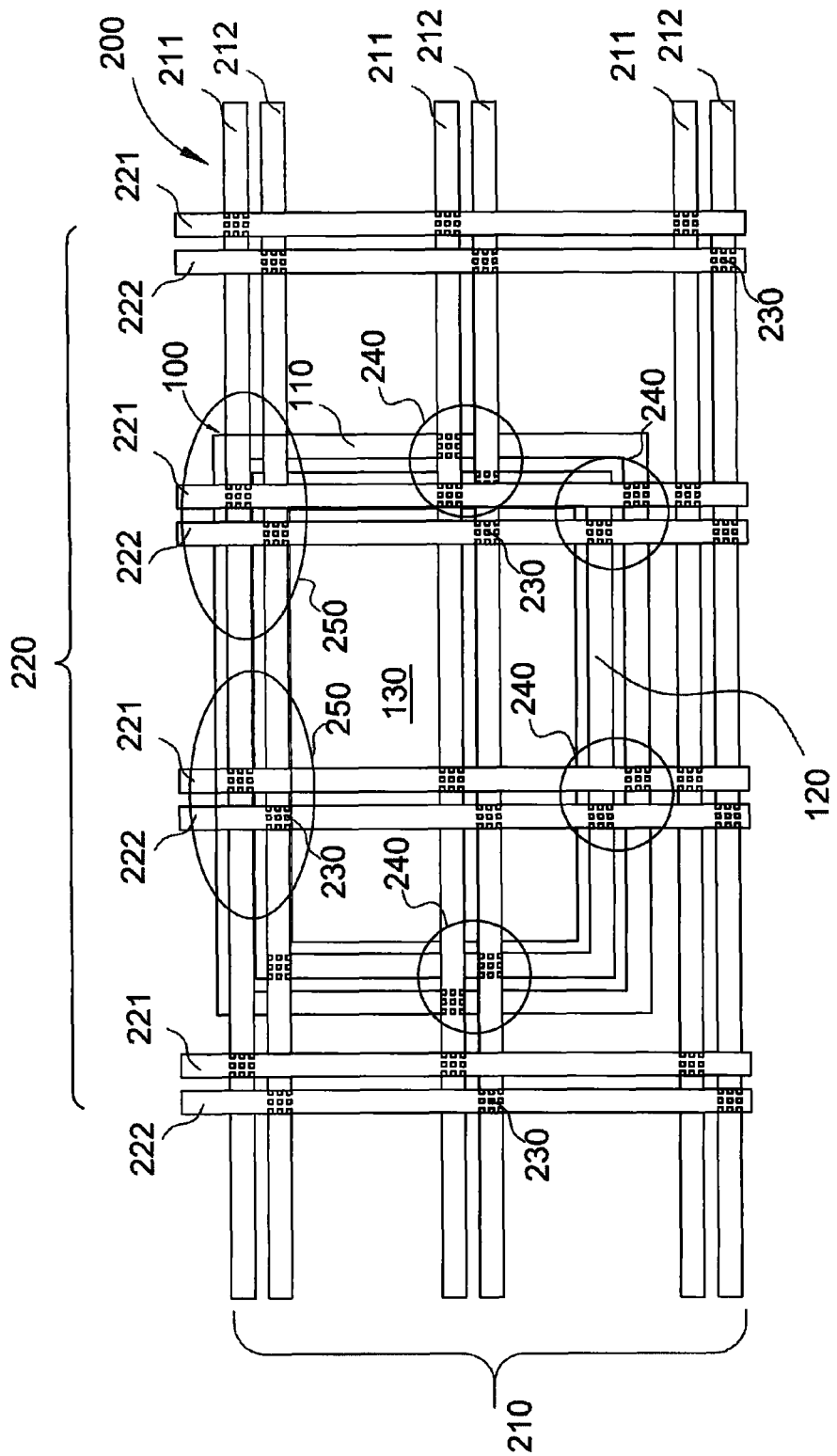
FIG. 3 shows a schematic diagram illustrating the macro block, the annular power supplying lines, and the power mesh above the macro block in FIG. 1
Figure 4:
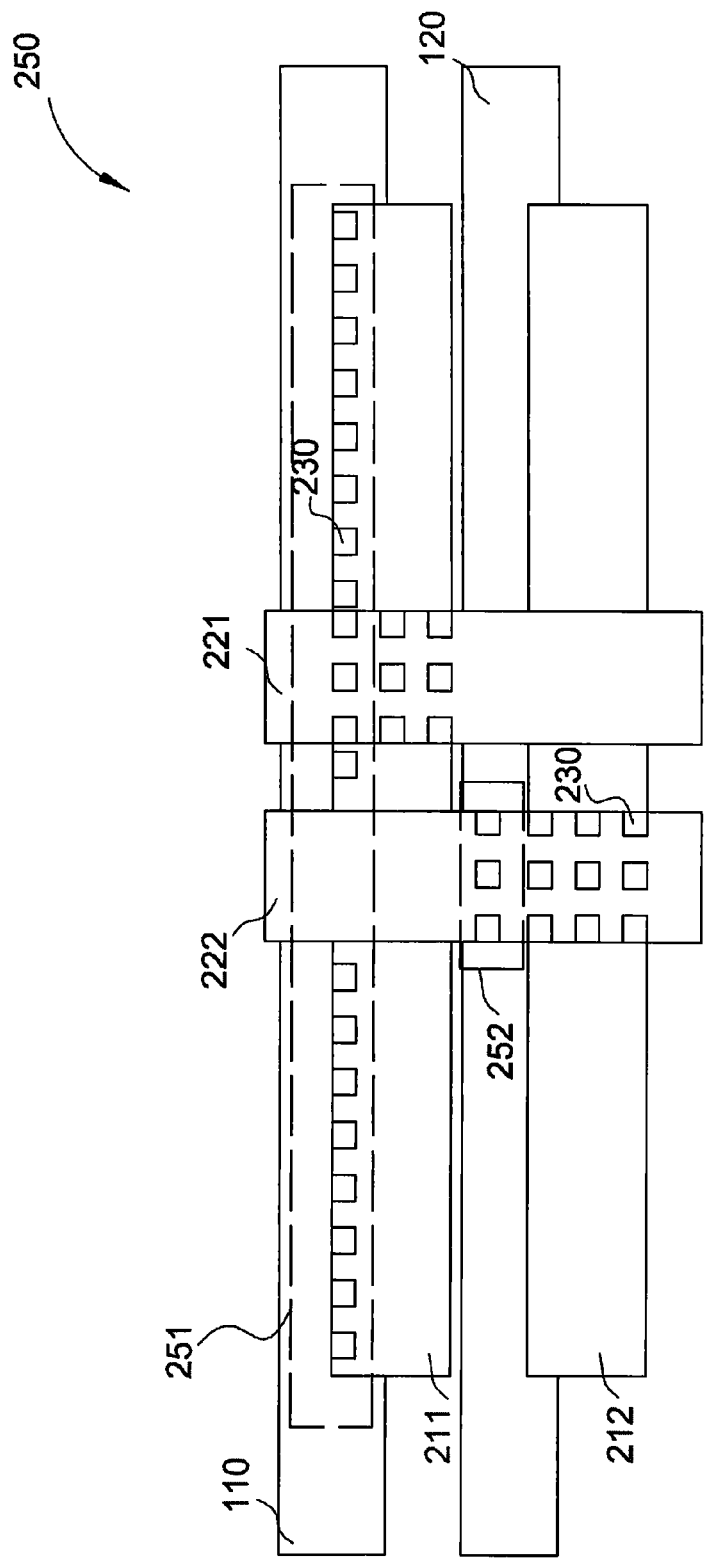
FIG. 4 shows an enlarged schematic diagram illustrating an area in FIG. 3.

Next, the APR tool according to the invention defines the portion of the power mesh 530 that is growing along the same corresponding direction as that for the power supplying lines 110, 120 and also overlaps the power supplying lines 110, 120 in the lower layer. The APR tool then removes such a portion (Step 604) to define a corrected power mesh. Please refer to FIG. 2 and FIG. 5. As shown in the power mesh 200 of FIG. 2, the portion of the power supplying line 210, that is growing along the same corresponding direction as the direction of the annular power supplying line and also overlaps the annular power supplying line in lower the layer, also causes the above mentioned problem. Therefore, removing the overlapping portion as shown in FIG. 5 avoids the problems in the prior art. After removing the overlapping portion, it becomes the corrected power mesh 500 shown in FIG. 5.

Finally, the APR tool according to the invention utilizes the via and the via plug 530 to couple the power mesh 500 and the annular power supplying lines 110, 120 (Step 606) together. Then, the power needed by the macro block 100 can be conducted into the macro block through the power mesh 500 and the annular power supplying line 110. Please note that, since the overall structure of the power mesh 500 has been completed based on the technical content disclosed up to now, it is not difficult to do the placement of the via and the via plug 530 by those who are skilled in the art and thus the details will not be repeated hereinafter.

Please note that only examples of the horizontal power supplying line 510 having the portion overlapping the annular power supplying line below are disclosed in the above. Therefore, the disclosure only teaches the removal of the overlapping portion of the horizontal power supplying line 510. But, in practical applications, the vertical power supplying line 520 can also overlap the annular power supplying line below. In one preferred embodiment of the invention, in order to prevent the vertical power supplying line 520 and the annular power supplying line below from forming the wall-like vias, the portion of the vertical power supplying line 520 overlapping the annular power supplying line below is also removed. Such equivalent changes are foreseeable by those who are skilled in the art and the details will not be repeated hereinafter.

Figure 1:
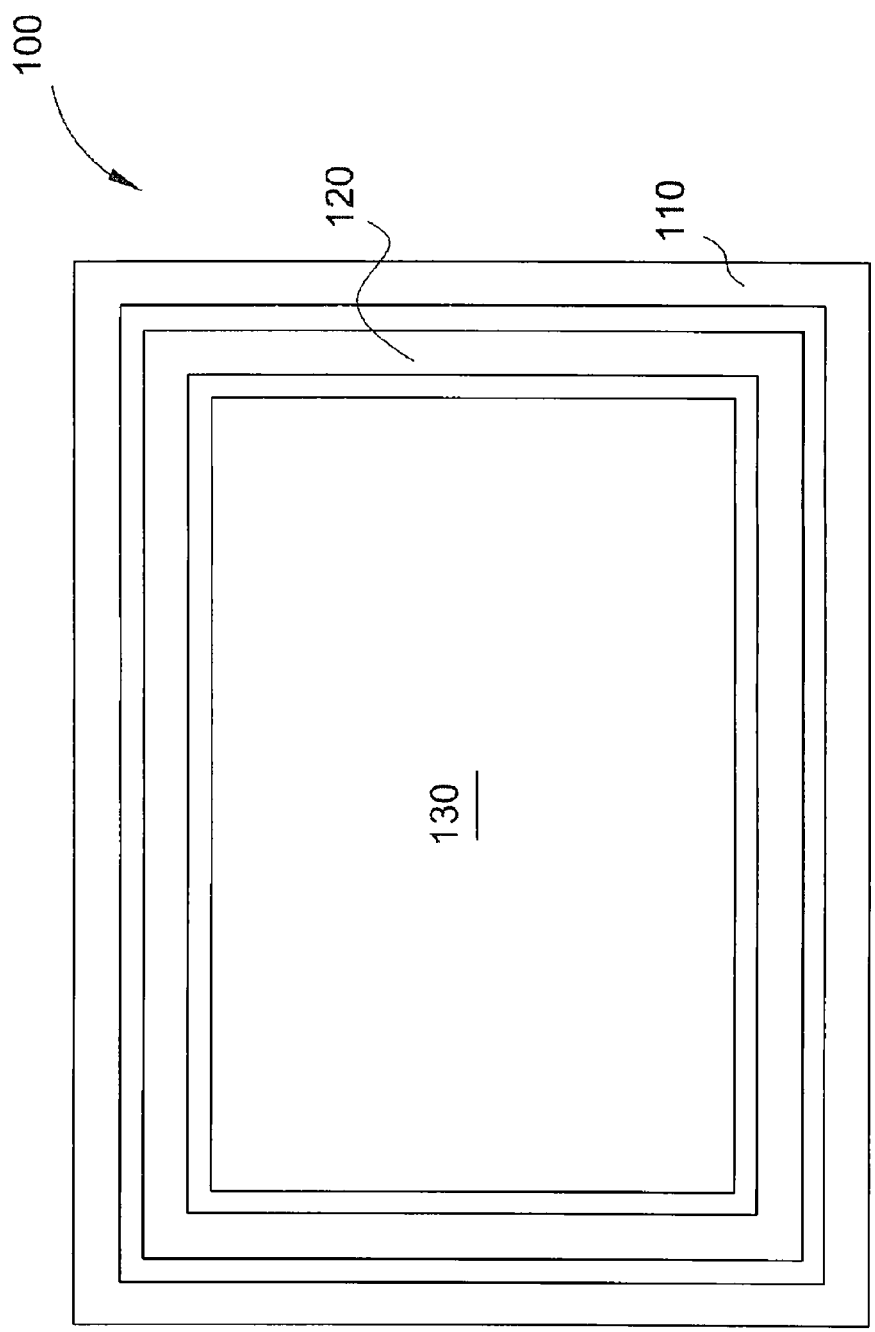
FIG. 1 shows a schematic diagram illustrating a macro block and the related annular power supplying lines managed by the APR tool according to the prior art.
Figure 7:
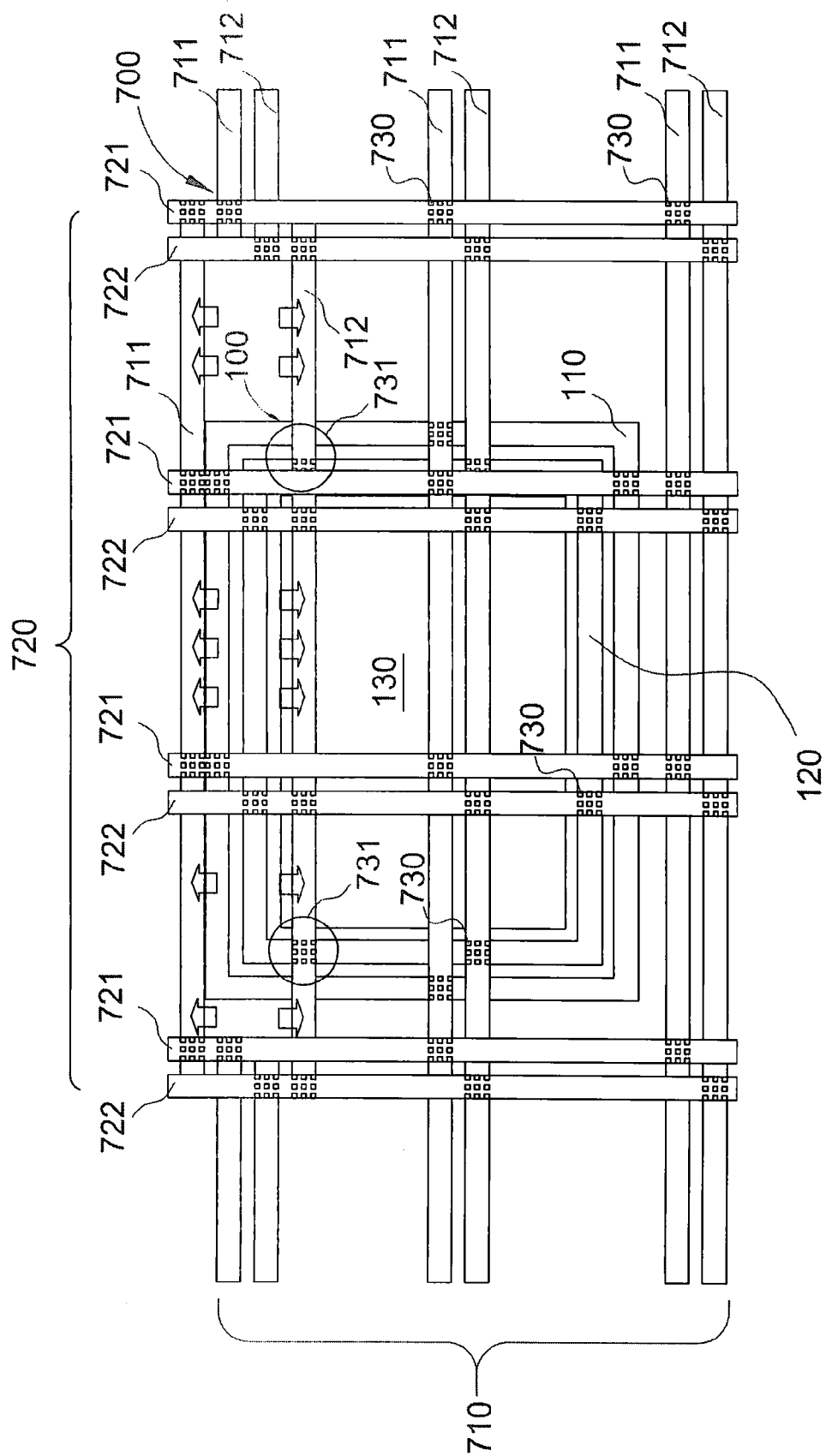
FIG. 7 shows a schematic diagram illustrating a macro block and the related power mesh managed by the APR tool according to a second embodiment of the invention.

Please refer to FIG. 7 which shows a schematic diagram illustrating a macro block and the related power mesh managed by the APR tool according to the second embodiment of the invention. Similarly, the macro block 100, the related annular power supplying lines 110, 120, and the internal circuitry 130 shown in FIG. 7 have the same functions as the macro block 100, the related annular power supplying lines 110, 120, and the internal circuitry 130 shown in FIG. 1 and operate in the same manner. The power lines 711, 721 and the ground lines 712, 722 also have the same functions as the power lines 211, 221 and the ground lines 212, 222 mentioned before. But, please note that the structure of the power mesh 700 is different from the above mentioned power mesh 200.

As shown in FIG. 7, the power mesh 700 also includes the horizontal power supplying line 710 and the vertical power supplying line 720. The vertical power supplying line 720 is located in the layer above the horizontal power supplying line 710. However, please note that the power mesh 700 and the annular power supplying lines 110, 120 do not have any overlapping portion that is growing along the same corresponding direction (that is neighboring in parallel) (as shown in the figure, the portion that was overlapping is shifted to other locations). Therefore, in the embodiments according to the invention, the situation of forming a wall-like structure by the via or blocking the via from coupling to the annular power supplying lines 110/120 in the prior art will not happen.

Figure 8:
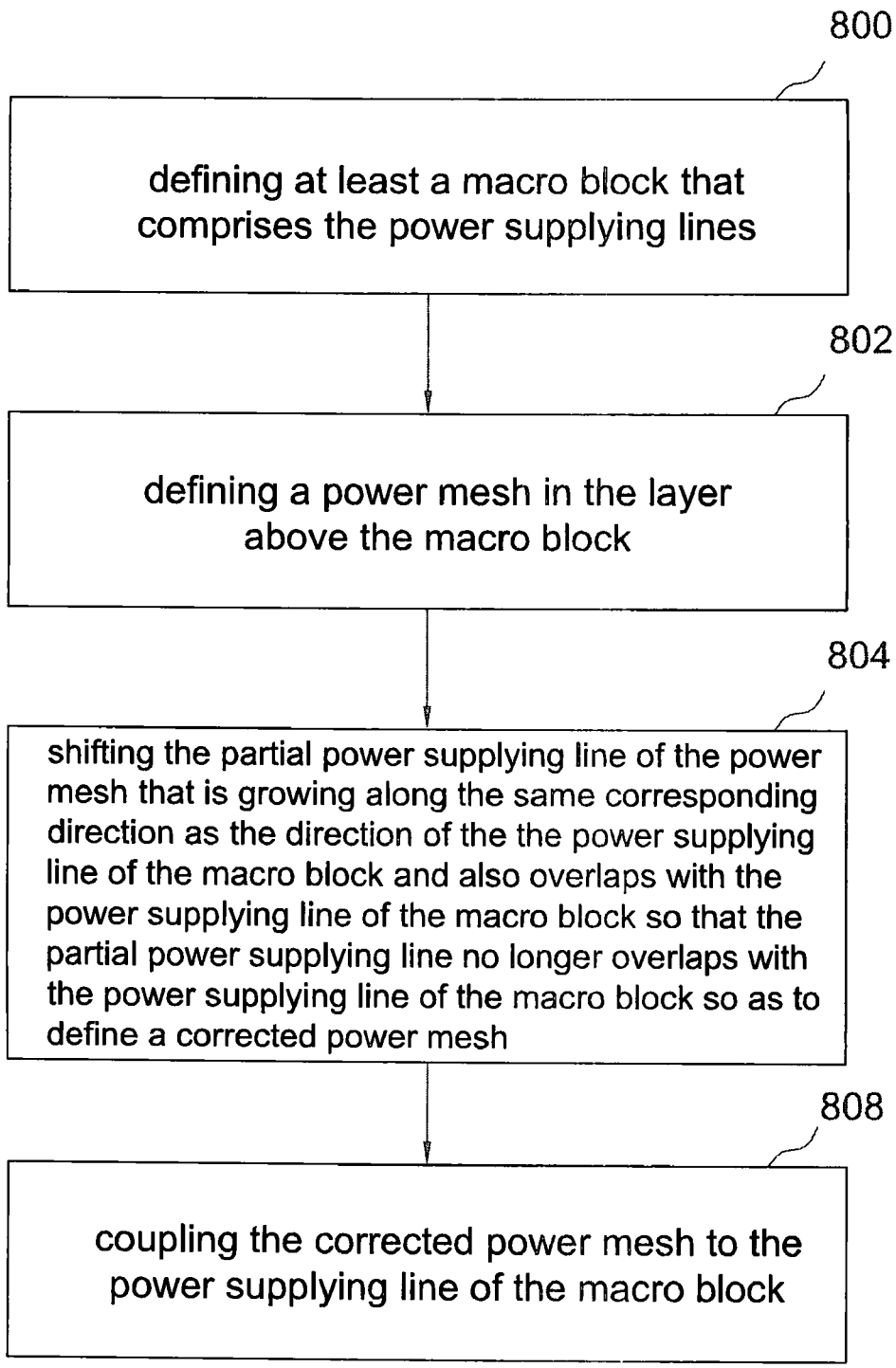
FIG. 8 shows a flow chart illustrating the steps executed by the APR tool according to the another embodiment of the invention.

Please refer to FIG. 8 and FIG. 7. FIG. 8 shows the flow chart illustrating the steps executed by the APR tool according to another embodiment of the invention. The method comprises the following steps:

Step 800: defining at least a macro block 100 that comprises the power supplying lines 110, 120 and the internal circuitry 130;

Step 802: defining a power mesh in the layer above the macro block that includes a structure along the vertical direction and a structure along the horizontal direction that are placed in different metal layers;

Step 804: shifting the partial power supplying line of the power mesh that is growing along the same corresponding direction as the direction of the power supplying line of the macro block and also overlaps with the power supplying line of the macro block so that the partial power supplying line no longer overlaps with the power supplying line of the macro block below along neighboring parallel direction so as to define a corrected power mesh; and Step 806: coupling the corrected power mesh to the power supplying line of the macro block by way of the via and the via plug that are formed in the overlapping area where the corrected power mesh vertically intersects with the power supplying line of the macro block according to one embodiment of the invention.

Please note that the steps 800, 802, 806 are the same as the steps 600, 602, 606 and the details will not be repeated hereinafter. However, the step 804 according to this embodiment of the invention is different from the step 604 mentioned before. Please note that in the step 804, the APR tool according to the invention uses the practice of shifting the partial power supplying line to replace the practice of removing the partial power supplying line as mentioned before. The benefit is that, after shifting, there are still opportunities for the shifted partial power supplying line to couple to the annular power connecting line below in the vertically intersecting overlapping area (such as the area 731 shown in FIG. 7). Therefore, the flexibility of managing the vias is increased and the resistance can be reduced as much as possible. The problem of blocking the vias or forming a wall-like structure by the vias in the prior art will not happen, either.

Similarly, as shown in FIG. 7, since only the horizontal power supplying line 710 has the portion that overlaps with the annular power supplying line below, only the overlapping portion of the horizontal power supplying line 710 is removed. But, in practical applications, the vertical power supplying line 720 may also include the portion that overlaps with the annular power supplying line below. In one preferred embodiment of the invention, to prevent the vertical power supplying line 720 and the annular power supplying line below from forming the wall-like vias, the portion of the vertical power supplying line 720 that overlaps with the annular power supplying line below is also shifted to other location. Although, as shown in FIG. 7, one of the two power supplying lines is shifted upward and the other one is shifted downward, the invention is not limited by these examples. In other embodiments of the invention, even if both of the two power supplying lines are shifted upward or downward, it is still encompassed by the scope of the present invention.

Those who are skilled in the art should be able to understand the content disclosed up to now and the APR tool according to the invention can be developed. The step that removes or shifts the neighboring parallel area of the power supplying line is taken as an example. As is well known by those who are skilled in the design of APR process flow, the portion to be removed or the position to be shifted can be determined by marking coordinates. Therefore, the details of the program code of the APR tool will not be repeated hereinafter. Besides, although the APR tool is used as an example of the circuit layout tool in the above mentioned disclosure, the invention is not limited by this example. For instance, those who are skilled in the art can use various methods to manage the above mentioned circuit layout. But, no matter whether APR tool or manual practice is used to execute the above mentioned managing steps or to draw the above mentioned circuit layout, such equivalent changes are still encompassed by the scope of the present invention.

In other words, if a circuit layout comprises a macro block having power supplying lines and a power mesh in the upper layer. The power mesh of the circuit layout is a uniformly distributed power mesh. The portion of the power mesh that is growing along the same corresponding direction as the direction of the power supplying line of the macro block and also overlaps with the power supplying line of the macro block is either removed or shifted. Then, such a circuit layout is to be encompassed by the scope of the present invention.

Please note that, the purpose of showing only 3~4 sets of power supplying lines (including the ground lines and the power lines) in the power meshes in FIG. 5 and FIG. 7 is only to facilitate the clarity of description. In practical applications, the power meshes 500, 700 in the layer above the macro block can be of much denser power meshes.

Compared to the prior art, the APR tool according to the invention provides better circuit layout to prevent the via from forming the wall-like structure and thereby avoiding the wall-like structure from blocking other conducting lines. Therefore, the embodiments according to the invention can increase the flexibility of circuit design.

Although the present invention has been fully described by way of above-mentioned examples of embodiment, however, it should not be construed as any limitation on the scope of the invention. Various modifications or changes can be performed by those who are skilled in the art without deviating from the scope of the invention.

What is claimed is:

1. A power mesh management method executed by a computer, applicable to place a power mesh in an integrated circuit having at least one macro block, where each macro block comprises at least one macro block power supplying line growing along in a first direction, the management method comprising:
   defining, using the computer, a plurality of first power supplying lines located in a metal layer above the macro block, wherein each of the first supplying lines grows along in the first direction;
   defining, using the computer, a plurality of second power supplying lines located in another metal layer above the macro block, wherein each of the second supplying lines grows along in a second direction;
   defining, using the computer, a partial power supplying line, overlapping the macro block power supplying line, from the plurality of first power supplying lines;
   removing, using the computer, the partial power supplying line from the plurality of first power supplying lines; and
   defining at least one parallel shifted power supplying line growing along the first direction from positions other than the position occupied by the partial power supplying line.

2. The power mesh management method according to claim 1, further comprising:
   coupling the power mesh to an external power and the macro block power supplying line for inputting the external power to the macro block through the power mesh and the macro block power supplying line.

3. The power mesh management method according to claim 1, wherein the macro block power supplying line comprises at least one power line and at least one ground line.

4. The power mesh management method according to claim 3, wherein the plurality of first power supplying lines comprise a plurality of power lines and a plurality of ground lines interlacing with the plurality of power lines.

5. The power mesh management method according to claim 4, wherein the plurality of ground lines of the plurality of first power supplying lines couple to the ground line of the macro block by way of at least one via plug, and the plurality of power lines of the plurality of first power supplying lines couple to the power line of the macro block by way of at least one via plug.

6. The power mesh management method according to claim 3, wherein the second power supplying lines comprise a plurality of power lines and a plurality of ground lines interlacing with the plurality of power lines.

7. The power mesh management method according to claim 6, wherein the ground lines of the second power supplying lines couple to the ground line of the macro block by way of at least one via plug, and the power lines of the second power supplying lines couple to the power line of the macro block by way of at least one via plug.

8. The power mesh management method according to claim 1, wherein the macro block power supplying line, the plurality of first power supplying lines and the plurality of second power supplying lines are respectively located in different metal layer.

9. The power mesh management method according to claim 1, wherein the first direction and the second direction are substantially forming 90 degree angle.

10. An integrated circuit layout structure, comprising:
at least one macro block, wherein each macro block comprises at least one macro block power supplying line growing along in a first direction;
a power mesh located in at least one metal layer above the macro block for electrically coupling to an external power and the macro block to input the external power to the macro block for providing the power needed by the macro block, wherein the power mesh comprises:
a plurality of first power supplying lines, where each of the first supplying lines grows along in the first direction;
a plurality of second power supplying lines, where each of the second supplying lines grows along in the second direction;
a plurality of via holes and via plugs located between the macro block and the power mesh for forming the electrical coupling between the macro block and the power mesh, said plurality of via holes coupling to the external power and the macro block to input the external power to the macro block;
wherein none of the first power supplying lines; and
at least one parallel shifted power supplying line growing along the first direction is placed above the macro block power supplying line to overlap the position of the macro block power supplying line.

11. The integrated circuit layout structure according to claim 10, wherein the macro block power supplying line comprises at least one power line and at least one ground line.

12. The integrated circuit layout structure according to claim 11, wherein the plurality of first power supplying lines comprise a plurality of power lines and a plurality of ground lines interlacing with the plurality of power lines.

13. The integrated circuit layout structure according to claim 12, wherein the ground lines of the first power supplying lines couple to the ground line of the first power supplying line by way of at least one via plug, and the plurality of power lines in the N second power supplying lines couple to the power line of the first power supplying line by way of at least one via plug.

14. The integrated circuit layout structure according to claim 11, wherein the plurality of second power supplying lines comprise a plurality of power lines and a plurality of ground lines interlacing with the plurality of power lines.

15. The integrated circuit layout structure according to claim 14, wherein the ground lines of the second power supplying lines couple to the ground line of the first power supplying line by way of at least one via plug, and the power lines of the second power supplying lines couple to the power line of the first power supplying line by way of at least one via plug.

16. The integrated circuit layout structure according to claim 10, wherein the macro block power supplying line, the plurality of first power supplying lines and the plurality of second power supplying lines are respectively located in different metal layer.

17. The integrated circuit layout structure according to claim 10, wherein the first direction and the second direction are substantially forming 90 degree angle.

* * * * *